US006359600B1

(12) United States Patent
Mijnsbergen et al.

(10) Patent No.: US 6,359,600 B1
(45) Date of Patent: Mar. 19, 2002

(54) MATRIX DISPLAY DEVICE FOR DISPLAYING A LESSER NUMBER OF VIDEO LINES ON A GREATER NUMBER OF DISPLAY LINES

(75) Inventors: Frederik C. G. Mijnsbergen, Nuenen; Sipke Bijlsma, Eindoven, both of (NL)

(73) Assignee: Flat Panel Display Company (NL)

( * ) Notice: Subject to any disclaimer, the term of this patent is extended or adjusted under 35 U.S.C. 154(b) by 0 days.

(21) Appl. No.: 09/348,918

(22) Filed: Jul. 6, 1999

(30) Foreign Application Priority Data

Jul. 6, 1998 (EP) ........................................... 98202259

(51) Int. Cl.[7] .......................... G09G 5/00; H04N 11/20

(52) U.S. Cl. ......................... 345/3.3; 345/204; 345/3.2; 348/441; 348/458

(58) Field of Search .......................... 345/99, 100, 112, 345/204, 213, 698, 699, 3.2, 3.3; 382/298, 299, 300; 348/443, 445, 441, 448, 458, 581, 561, 704, 556; 358/451

(56) References Cited

U.S. PATENT DOCUMENTS

| | | | | |
|---|---|---|---|---|
| 4,821,031 A | * | 4/1989 | Roberts | 345/671 |
| 4,866,520 A | * | 9/1989 | Nomura et al. | 348/441 |
| 4,935,731 A | * | 6/1990 | Takebe et al. | 345/213 |
| 5,335,023 A | * | 8/1994 | Edwards | 348/458 |
| 5,448,259 A | * | 9/1995 | Hidaka | 345/99 |
| 5,682,170 A | * | 10/1997 | Kotha et al. | 345/3.2 |
| 5,793,350 A | * | 8/1998 | Chandavarkar et al. | 345/667 |
| 6,037,925 A | * | 3/2000 | Kim | 345/99 |
| 6,130,660 A | * | 10/2000 | Imsand | 345/698 |
| 6,141,061 A | * | 10/2000 | Takeuchi | 345/581 |

FOREIGN PATENT DOCUMENTS

| | | | | |
|---|---|---|---|---|
| EP | 0565167 A2 | 10/1993 | | H04N/3/12 |
| EP | 0794524 A2 | 9/1997 | | C09G/3/20 |
| GB | 2262377 A | 6/1993 | | G09G/3/36 |

* cited by examiner

*Primary Examiner*—Steven Saras
*Assistant Examiner*—Paul A. Bell

(57) ABSTRACT

A matrix display device comprises a matrix display (10) with picture elements (18) arranged in a number of display lines (R). A driving circuit (3) supplies picture signals (Ds) to the picture elements (18) dependent on a video signal (V) which comprises, in a field (Fp), a number of video lines which is lower than the number of display lines (R). A line period (Tl) is defined as the duration of one of the video lines. To display video information on all display lines (R) regularly, after a number of line periods (Tl), more than one display line (R) is selected within one line period (Tl) to write video information to more than one display line (R). Therefore, a timing circuit (21) receives video timing information (S) to determine consecutive and non-overlapping select periods (Tr), each select period (Tr) completely occurring within a line period (Tl). In at least one of the line periods (Tl), at least two select periods (Tr) occur. A selecting circuit (20) successively selects the display lines (R), each display line (R) being selected during an associated one of the select periods (Tr). The timing circuit (21) according to the invention is adapted to obtain select periods (Tr) all having a substantially equal duration. Thus, the select periods (Tr) during line periods (Tl), during which only one display line (R) is selected, have the same duration as the select periods (Tr) during line periods(Tl) during which more than one display line (R) is displayed.

7 Claims, 3 Drawing Sheets

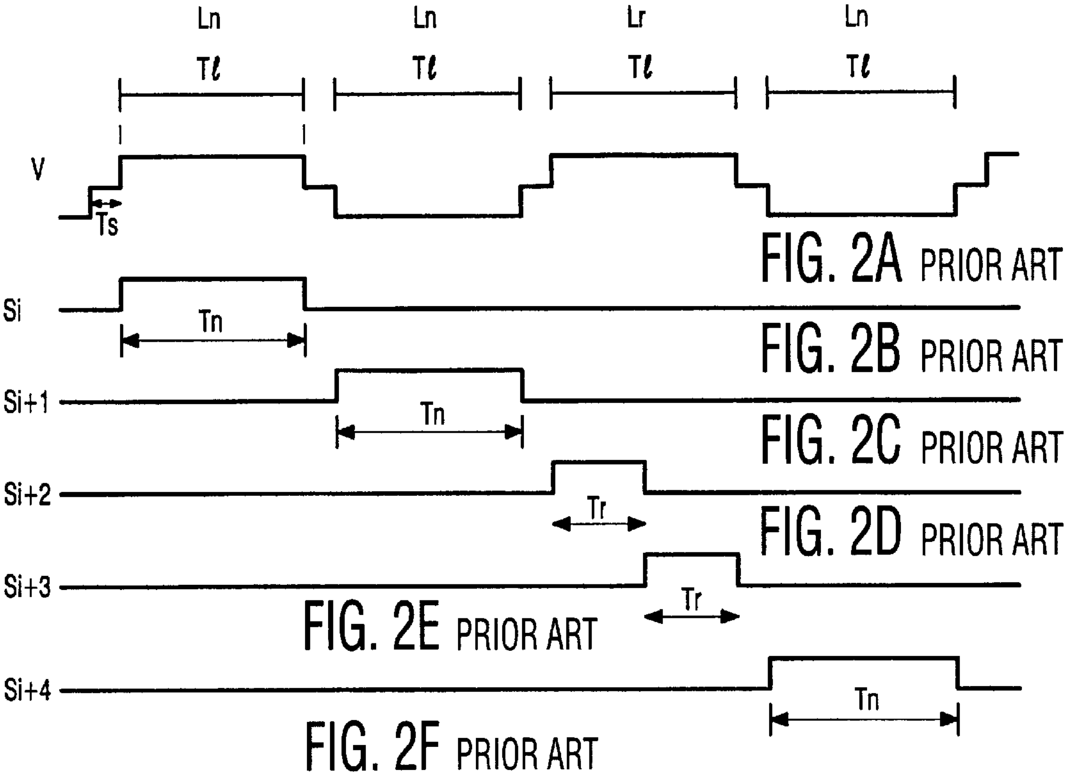
FIG. 2A PRIOR ART
FIG. 2B PRIOR ART
FIG. 2C PRIOR ART
FIG. 2D PRIOR ART
FIG. 2E PRIOR ART
FIG. 2F PRIOR ART
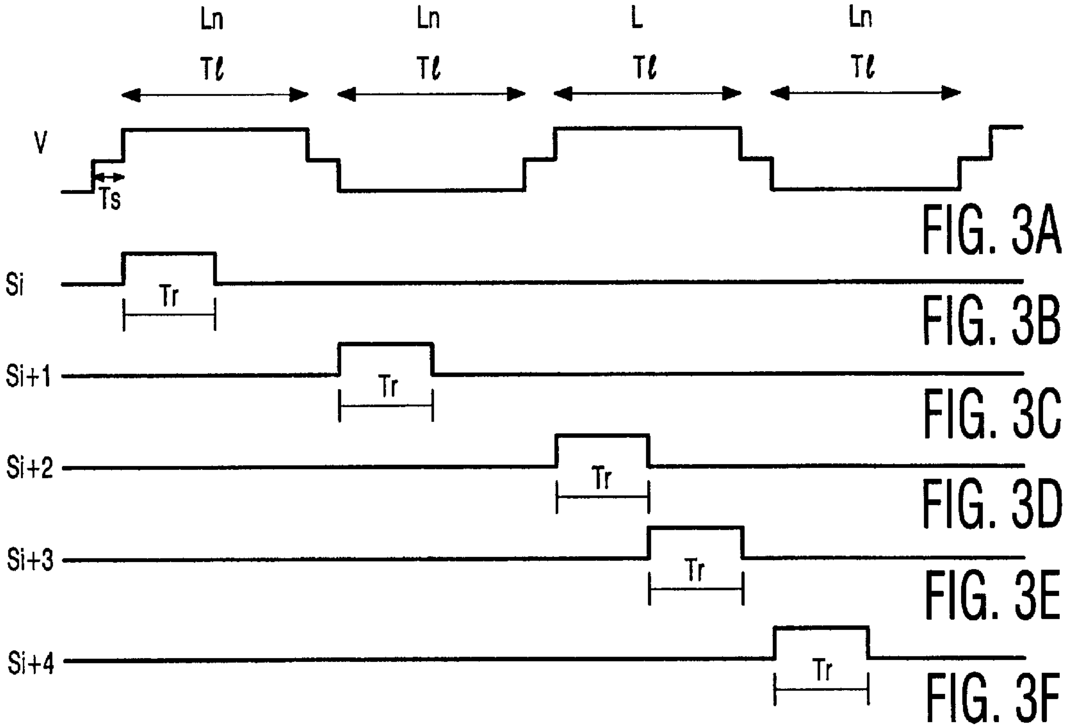
FIG. 3A
FIG. 3B
FIG. 3C
FIG. 3D
FIG. 3E
FIG. 3F

| | Fp,n | Fp,n+1 |
|---|---|---|
| Ri | + | - |
| Ri+1 | - | + |
| Ri+2 | + | - |
| Ri+3 | + | - |
| Ri+4 | - | + |
| Ri+5 | + | - |
| Ri+6 | - | + |
| Ri+7 | - | + |
| Ri+8 | + | - |

MATRIX DISPLAY DEVICE FOR DISPLAYING A LESSER NUMBER OF VIDEO LINES ON A GREATER NUMBER OF DISPLAY LINES

BACKGROUND OF THE INVENTION

The invention relates to a matrix display device as defined in the pre characterizing part of claim 1. Such a matrix display device is especially useful for displaying a video signal with a number of video lines which is lower than a number of display lines of a matrix display of the matrix display device.

EP-A-0565167 discloses a solution to displaying an NTSC video signal on a PAL matrix display. In this prior art, a row driver circuit drives several rows of picture elements with the same picture information to repeat certain lines of the NTSC video signal. In this way, the picture is effectively expanded in the vertical direction to fill the available display area. However, this technique may lead to perceivable display artifacts. Differences in the picture element voltages for repeated and non-repeated lines may occur.

OBJECTS AND SUMMARY OF THE INVENTION

It is, inter alia, an object of the invention to provide a solution to expanding a video signal with a number of scanning lines which is smaller than the number of display lines of the matrix display with fewer artifacts.

The matrix display device according to the invention comprises a matrix display with picture elements arranged in a predetermined number of display lines. A driving circuit supplies picture signals to the picture elements, a timing circuit generates select periods, and a selecting circuit selects the display lines.

The driving circuit receives a video signal which comprises a number of video lines which is lower than the number of display lines of the matrix display, and supplies picture data signals which are dependent on an associated one of the video lines to picture elements of a selected one of the display lines. The timing circuit receives video timing information to supply consecutive and non-overlapping select periods. Each select period occurs completely within a line period which has the duration of one of the video lines. This implies that the select periods are locked to a repetition period of the video lines. The video timing information may comprise line and field synchronizing pulses of the video signal. The selecting circuit generates consecutive select pulses to successively select the display lines during the consecutive select periods.

As the number of video lines is lower than the number of display lines of the matrix display, the matrix display device has to generate extra video lines. The extra video lines are generated during certain line periods which, for the sake of clarity, are further referred to as repeating line periods. During these repeating line periods, at least two select periods are present for selecting successively at least two corresponding display lines, both of which receive video information. In the other line periods, which are referred to as normal line periods, the video information of a line period is displayed on the corresponding display line.

In the prior art, the select period during a normal line period is substantially equal to the line period, while in repeating line periods in which two select periods occur, the select periods are substantially equal to half the line period. These different select times cause striping artifacts. The invention reduces these striping artifacts to a large extent by selecting the select periods during the normal line periods to be equal to the select periods as occur during the repeating line periods.

For example, in one embodiment of the invention, after a certain number of consecutive normal video line periods, during a repeating line period, two consecutive select periods are generated to display video data signals on two consecutive display lines. The two select periods fit within the duration of one line period of the video signal. Consequently, all display lines are selected during a select period which is smaller than half the line period. In a practical case, wherein an expansion factor of 4:3 is required, the timing circuit generates a repeating line period after every two consecutive normal line periods. In this way, the repeating line periods are evenly distributed across the display lines, and only one line of extra video information has to be generated during the repeating line period.

In another embodiment of the invention, the extra video information is obtained in a simple way by repeating the video information of a line period. In this way, the same video information is displayed on the two consecutive display lines.

In yet another embodiment of the invention, the extra video information depends on the video information of more than one line period. For example, the extra video information may be interpolated from the video information of two adjacent line periods.

According to EP-A-0565167, the artifacts of the prior art caused by non-equal select times are minimized by controlling a row driver circuit in such a way that it scans the rows of picture elements in turn at a rate which is a function of the number of rows in a panel and the field period of the applied video signal. In this way, all the rows (the display lines) are addressed within one field period of the video signal with an equal addressing period (the select period). It should be noted that the row driver circuit is operated in an asynchronous manner: the timing of the row driver circuit is not directly linked with the timing of the video lines. Consequently, the select periods do not occur completely within one of the line periods. This results in a complicated driving circuit. Furthermore, the asynchronous display of the video signal may also cause artifacts. Thus, although EP-A-0565167 discloses the problem of the prior art, a totally different solution to obtaining select periods all having the same duration is disclosed when compared with the solution provided by the present invention.

EP-A-0794524 discloses a matrix display with aspect ratio conversion. The matrix display is a liquid crystal display (LCD) with an aspect ratio of 16:9 and 240 display lines. If an EDTV2 (Extended Definition Television 2) video signal with 180 scanning lines per frame is displayed on such a display, the top and bottom part of the display will not receive a video signal, as the number of scanning lines (the line periods) in the video signal is smaller than the number of select lines (the display lines) of the display. A driving circuit has been provided which writes a scanning line of the video signal simultaneously into two select lines once in every three scanning lines of the video signal. In this way, a video signal with a number of scanning lines which is smaller than the number of select lines of the LCD is vertically expanded to also display video in the top and bottom part of the display. A principal difference between this prior art and the present invention is that, according to the present invention, the select periods are non-overlapping. This prior-art solution cannot be implemented in matrix displays in which the simultaneous selection of select lines causes artifacts, or if the selecting circuit is unable to select more than one select line at a time.

Although the striping artifacts due to the different select periods of the prior art are effectively reduced in the present invention, still some annoying striping may remain visible in that the first video line in a repeating line period appears darker than the other video lines.

Another embodiment of the invention is based on the insight that this residual striping is caused by the fact that the polarity of the video lines in the repeating line period is equal, while the polarity between other display lines changes sign. Video lines which are followed by a video line with the same polarity appear darker. The difference of transmission between the display lines is compensated by adapting the drive signals in such a way that the transmission of the darker rows is increased, or that the transmission of the brighter rows is decreased.

In another embodiment of the invention, in a TFT LCD, the difference of transmission between the display lines is compensated by adapting the common signal in such a way that the transmission of the darker rows is increased, or that the transmission of the brighter rows is decreased. The common signal is supplied to the common electrode which interconnects the picture elements.

In still another embodiment of the invention, in a TFT LCD, the transmission of all display lines has been made equal by increasing the amount of kickback in positive fields for the darker rows, and by decreasing the amount of kickback in negative fields for the darker rows, or the other way around for the lighter rows. The amount of kickback may be influenced by superimposing a square-wave signal on the gate select signal of the TFTs. The kickback effect is the capacitive crosstalk from the gate select signal to the picture elements via the gate source capacitance of the TFTs.

These and other aspects of the invention will be apparent from and elucidated with reference to the embodiments described hereinafter.

BRIEF DESCRIPTION OF THE DRAWING

In the drawing:

FIGS. 2A–2F show timing diagrams elucidating the timing of video lines and select pulses according to the prior art, FIGS. 3A–3F show timing diagrams elucidating the timing of video lines and select pulses of an embodiment according to the invention.

DESCRIPTION OF THE PREFERRED EMBODIMENTS

Figure 1:
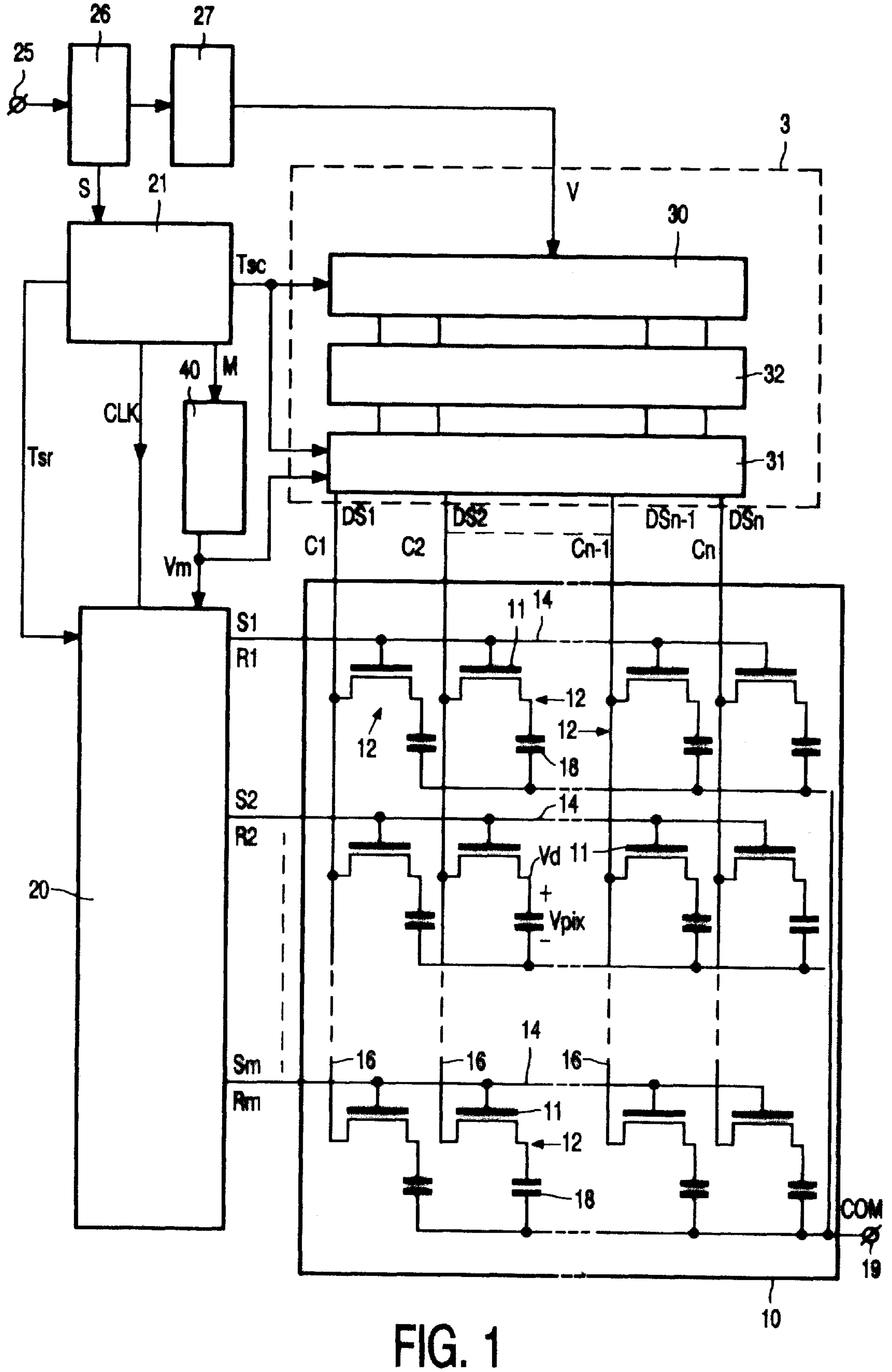
FIG. 1 shows a schematic circuit diagram of an embodiment of a matrix display device according to the invention.

FIG. 1 shows a schematic circuit diagram of an embodiment of a matrix display device according to the invention. Although the invention is not limited to a certain type of matrix display, for the sake of clarity, the invention will be elucidated with respect to a matrix display device with an active TFT Liquid Crystal Display (LCD).

Active LCD devices intended for displaying video pictures are well known in the art. For example, for further information on driving such an LCD device with line inversion see GB-A-2134300 which is herewith incorporated by reference.

The LCD device comprises an active matrix-addressed LCD panel 10 having a row and a column array which consists of m rows R1 to Rm with n horizontally arranged picture elements 18 in each row Ri. The picture elements 18 are liquid crystal (LC) elements located adjacent a respective intersection of row and column conductors 14 and 16, respectively. Each picture element 18 is associated with a switching device 11, in this example in the form of a thin-film transistor (TFT). The gate terminals of all TFTs 11 associated with picture elements 18 in a same row Ri are connected to a common row conductor 14 to which select pulses Si (S1 to Sm) are supplied. Likewise, the source terminal of the TFTs associated with picture elements 18 in a same column Ci (Cl to Cn)are connected to a common column conductor 16 to which picture data signals Dsi (Ds1 to Dsn) are applied. The still unconnected terminals of the LC elements 18 are connected to a common electrode 19 to which a common signal COM is supplied. The matrix display panel 10 is driven by a row driver circuit 20 and a column driver circuit 3 connected to the sets of row and column conductors 14 and 16, respectively. As the shown orientation of the matrix panel display 10 may differ in such a way that rows Ri and columns Ci are interchanged, the more general terms of selecting and driving circuit are often used for the row and column drivers 20, 3, respectively, and the row and column conductors 14, 16 are referred to as select and data conductors, respectively. Both drivers 20 and 3 are of a conventional type and will not be described in detail. Briefly, the row driver circuit 20 comprises a digital shift register (not shown) whose operation is controlled by regular clocking pulses CLK and control signals Tsr from a timing circuit 21 to which synchronization signals S derived from a video signal applied to an input 25 are supplied from a synchronization separator 26, and is operable by the timing circuit 21 to scan the row conductors 14 successively with selecting signals.

In the intervals between selecting signals, the row conductors are supplied with a substantially constant reference potential. Video data signals Ds are supplied to the column conductors 16 from the column driver circuit 3 which comprises a shift register circuit 30 and a sample-and-hold circuit 31.

The column driver circuit 3 is supplied with a video information signal V from a video processing circuit 27 and derived from the video signal applied to the input 25.

The synchronization signals S obtained in the synchronization separator 26 from the timing information of the input video signal are used by the control circuit 21 to produce timing signals Tsc for controlling the column driver circuit 3. The column driver circuit 3 performs serial-to-parallel conversion of the video information signal appropriate to the addressing of the panel 10. The panel 10 is driven one row at a time by scanning the row conductors 14 sequentially with a selecting signal so as to turn on each row Ri of TFTs in turn and applying data signals DSi to the column conductors 16. For every selected row Ri, the shift register 30 of the column driver circuit 3 converts the serial video data into parallel data which is stored in the sample-and-hold circuit 31 during the time the row Ri is selected. Using one row at a time addressing, all TFTs 11 of the addressed row Ri are switched on for a period determined by the duration of the selecting signal Si during which video information signals DSi present on the column conductors 16 are transferred to the picture elements 18. Upon termination of the selecting signal Si, the TFTs 11 of the row are turned off, thereby isolating the picture elements 18 from the conductors 16.

To avoid electrochemical degradation of the LC material, the polarity of the drive signals applied to the picture elements 18 is periodically inverted in accordance with known practice, although for simplicity, means by which this is achieved are not shown in FIG. 1. This polarity inversion can take place after every complete field of the display panel (field inversion) and optionally after every row address period as well (line inversion).

The matrix display device may comprise a signal-processing circuit 32 which may be arranged between the shift register circuit 30 and the hold circuit 31. The operation of the signal-processing circuit 32 is elucidated with respect to FIGS. 3 and 4.

The matrix display device may further comprise a voltage modulator 40 which receives timing information M from the timing circuit 21 to supply a modulating voltage Vm to the row driver circuit 20 and/or the hold circuit 31. The operation of the voltage modulator 40 is elucidated with respect to FIG. 4. The voltage modulator 40 may also be coupled to the common electrode 19.

The voltage on the drain of a TFT is denoted by Vd, and the voltage across a picture element 18 is denoted by Vpix.

FIG. 2 shows timing diagrams elucidating the timing of video lines and select pulses according to the prior art. FIG. 2A shows the line synchronizing periods Ts and the line periods Tl of the video signal V supplied to the shift register circuit 30. The video signal V shows the data signal Ds supplied to a certain column Ci, the line-by-line polarity inversion is indicated. FIGS. 2B to 2F show the select pulses Si to Si+4 supplied to successive rows (display lines) Ri to Ri+4. The select pulses Si, Si+1, Si+4 for the rows Ri, Ri+1 and Ri+4 have a duration Tn. The select pulses Si+2 and Si+3 have a duration Tr which is half the duration Tn. During the normal line periods Ln, the hold circuit 31 supplies the data signals Ds1 to Dsn in parallel to the picture elements 18 of a selected display line Ri. The data signals Ds1 to Dsn represent the video information to be displayed during the corresponding video line period Ln. In the same way, during a repeating line period Lr, the hold circuit 31 supplies the data signals Dsi which represent the video information of the corresponding video line Lr. As during this repeating line period Lr, two successive rows Ri+2 and Ri+3 are selected with the consecutive select pulses Si+2 and Si+3, the video information is displayed on both successive rows Ri+2 and Ri+3.

FIG. 3 shows timing diagrams elucidating the timing of video lines and select pulses of an embodiment according to the invention. FIG. 3A shows the horizontal synchronizing periods Ts and the line periods Tl of the video signal V. During a line period Tl, a line of the video signal V is supplied as parallel data signals Ds to the picture elements of a selected display line. In FIGS. 3, for simplicity, the active line period Tl of the video signal coincides with the period during which the data signals Ds associated with the video signal during this active line period Tl occur. In practice, these periods may be delayed with respect to each other. It is clear that the select pulses Si should be aligned with the periods during which the data signals Ds are supplied. It is further possible that the line periods Tl have a duration including the active video line period and the line synchronizing period Th. FIGS. 3B to 3F show the select pulses Si to Si+4 supplied to successive rows (display lines) Ri to Ri+4. The same indices refer to the same signals as in FIG. 2. The timing circuit 21 has beer adapted to supply the same select periods Tr during each line period Ti. For example, the timing circuit 21 comprises a counter which is started when a horizontal synchronization pulse has been detected and which counts from a certain value to another value to determine the duration of the select period Tn, Tr. This other value can easily be adapted to obtain one or more select periods Tr all having substantially the same duration, during each line period Tl.

When the driving circuit 3 is not adapted, the same video information is written to the two rows Ri+2 and Ri+3 which are successively selected within the same line period Tl.

A more sophisticated performance may be reached by interpolating the video information to be displayed on one of the two rows occurring within a repeating line period Lr. In this case, the shift register 30 is preceded by the video-processing unit 32 which comprises an interpolating circuit. The video-processing circuit 32 may be configured in one of many known ways. For example, an interpolated video line is generated from two successive lines of the video signal V. The samples of the interpolated video line may have the average value of corresponding samples of the two successive lines. As an example, the first of the two successive lines is displayed on the first row Ri+2 during the repeating line period Lr, the interpolated video line is displayed on the second row Ri+3 during the repeating line period Lr, and the second of the two successive lines is displayed during the normal line period Ln succeeding the repeating line period Lr. T he video-processing circuit 32 may also be arranged in front of the shift register 30 or between the hold circuit 31 and the set of column conductors 16.

Figures 4, 5A, 5B, 5C:
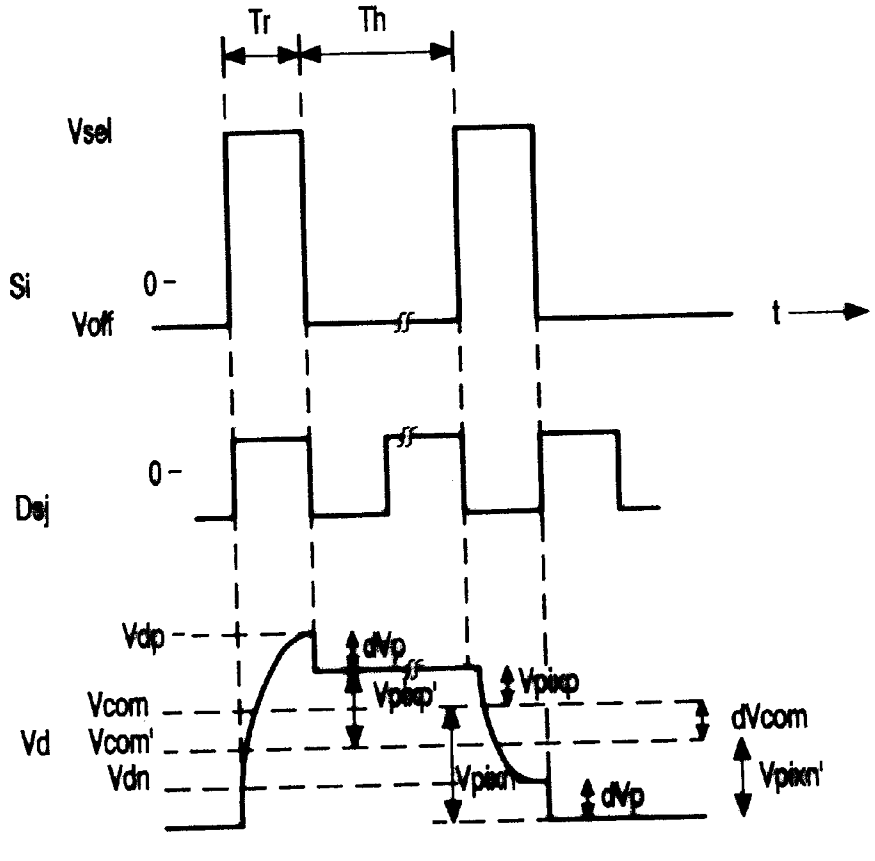
FIG. 4 shows the polarity of successive display lines in a positive and a negative field in an embodiment according to the invention.
FIGS. 5A–5C show waveforms explaining the kickback effect.

FIG. 4 shows the polarity of successive display lines Ri in a positive and a negative field according to an embodiment of the invention. The left column shows row numbers Ri indicating nine consecutive display lines Ri. The middle column shows the polarity of the video data Ds supplied to the consecutive display line s Ri during a positive field period Fp,n of the video signal V. The right column shows the polarity of the video data Ds supplied to the consecutive display lines Ri during a negative field period Fp,n+1 of the video signal V. Successive fields Fp have opposite polarities. The terms positive and negative field period Fp are defined in that the polarity of the video data Ds is positive or negative, respectively, for the first display line Ri in the respective field period Fp. In this way, the voltage across the picture elements 18 associated with a certain display line Ri is inverted every field to obtain an AC drive of the LC elements 18. Without repeating lines according to the invention (only one display line Ri is selected during every line period Ti), during the same field Fp, the polarity of the data signals Ds changes every line Ri. When the lines are repeated according to the invention (in certain line periods Tl, more than one display line Ri is selected), the polarity of the data signals Ds of the repeated lines may be equal. This is especially the case in the preferred embodiment wherein the same data signals Ds are written to two successive display lines Ri+2, Ri+3. FIG. 4 shows the polarity of the data signals Ds if every third video line is repeated once. It should be noted that the number of consecutive non-repeated video lines, and the number of repeated video lines depends on the expansion factor required or desired. As is shown in FIG. 4, the polarity of the video lines which are repeated and the consecutive repeated video lines is the same.

An embodiment of the present invention is based on the insight that the residual striping artifacts which may occur, although the select period Tr of all display lines Ri has been made equal according to the invention, is caused by a capacitive coupling between picture elements 18 of successive rows Ri. In the positive field Fp,n, the data signals Ds written to row Ri have a positive polarity, and the data signals Ds written to the next row Ri+1 have a negative polarity. The negative voltage swing of the pixels in row Ri+1 is capacitively coupled to the picture elements 18 of row Ri and consequently causes less positive voltages across the picture elements 18 of row Ri. The transmission of these picture elements 18 increases. A comparable effect occurs with respect to row Ri+1 which is written with a negative polarity while the next row Ri+2 is written with a positive polarity. The positive voltage swing of the pixels in row Ri+2 is capacitively coupled to the picture elements 18 of row Ri+1 and consequently causes less negative voltages across the picture elements of row Ri+1 and therefore increases the transmission of these picture elements 18. However, both the rows Ri+2 and Ri+3 are written with a positive polarity, and the transmission of the picture elements 18 of row Ri+2 is not increased via the capacitive coupling. This causes the picture elements 18 of row Ri+2 to appear darker than the picture elements of the rows Ri, Ri+1, and Ri+3. In general, all display lines Ri which are succeeded by a display line Ri with the same polarity appear darker than the other display lines Ri which are succeeded by a display line Ri with the opposite polarity. Based on this insight, several solutions are possible to minimize the residual striping dependent on the kind of matrix display used. All solutions have in common that the voltage across the picture elements 18 associated with a certain display line Ri has to be controlled in such a way that the transmission of all rows Ri becomes equal. It is possible to decrease the voltage across the picture elements 18 of the row Ri which appears darker, or to increase the voltage across the picture elements 18 of the rows Ri which appear brighter.

It is possible to correct for the transmission differences by adapting the values of the digital data signals Dsi with the signal-processing circuit 32 in dependence on the display line Ri selected.

Alternatively, in LCDs with two-pole non-linear switching elements, the voltage across the picture elements may be modulated by changing either the voltage level of the data signals Ds or the select pulses Si. It is also possible to control both voltage levels simultaneously. The voltage levels may be controlled by a voltage modulator 40 which generates a modulating voltage Vm to modulate the supply voltages of either one or both of the selecting circuit 20 and the driver circuit 3.

In TFT LCDs it is possible to modulate the data signal Ds or the common signal Com supplied to the junction point of all picture elements 18. It is, for example, possible to introduce a line-frequent sawtooth on the common signal Com to obtain different voltages across picture elements 18 belonging to successive rows Ri which are successively selected within the same line period Tl. It is further possible to apply the correction via the select pulses Si. This correction is based on the kickback of the gate signal of the TFTs 11 through the gate-drain capacitance of the TFTs 11. The kickback effect is further elucidated with respect to FIGS. 5. The description of the correction based on the kickback effect follows after the description of FIGS. 5.

FIG. 5 shows waveforms for elucidating the kickback effect. FIG. 5A shows gate select pulses Si for a certain display line Ri. FIG. 5B shows the video data signal Dsj supplied to one of the TFTs 11 associated with one of the picture elements 18. FIG. 5C shows the voltage Vd on the drain of this TFT 11 and the voltage Vpix across the associated picture element 18. The select pulse Si has the high voltage level Vsel during the select period Tr during which the picture elements 18 of the selected row Ri are connected between the column connectors 16 and the common electrode 19 to supply the video data signal Dsj to the picture elements 18. During the hold period Th, the select pulse Si has a low voltage value Voff, and the picture elements 18 are isolated from the column connectors 16 to hold the voltages across the picture elements 18 which are supplied during select period Tr. During the hold period Th, the other rows Ri are selected one by one. The two select pulses shown are associated with two successive fields. During the first select pulse, the video data signal Dsj has a positive polarity, during the second select pulse, the video data signal Dsj has a negative polarity.

During the first select pulse, the drain voltage Vd rises to the positive value Vdp. The falling edge of the first select pulse causes a voltage drop dVp of the drain voltage Vd due to the gate-drain capacitance. Consequently, the voltage Vpix across the picture element 18 has a value Vpixp which is the amount dVp too small and, consequently, the transmission of this picture element 18 is too high during the hold period.

During the second select pulse, the drain voltage Vd decreases to the negative value Vdn. Due to the gate-drain capacitance, again, the falling edge of the second select pulse causes a voltage drop dVp of the drain voltage Vd. Consequently, the voltage Vpix across the; picture element 18 has a value Vpixn which is the amount dVp too large during the hold period. Consequently, the transmission of this picture element 18 is too low. As is shown, the voltage Vpix across the picture element 18 is the difference between the drain voltage Vd and the common voltage Vcom which would be selected midway between Vdp and Vdn if the kickback effect did not occur. The kickback effect can be compensated for by lowering the common voltage Vcom by the amount dVp to obtain a corrected common voltage Vcom'.

Now, the intended picture element voltages occur which are designated by Vpixp' and Vpixn'.

The kickback effect can advantageously be used to modulate the voltage across the picture elements 18 associated with a row Ri. In a situation in which the polarity of the data signals Ds supplied to two consecutive rows Ri is positive (for example, the rows Ri+2 and Ri+3 in a positive field Fp,n, see FIG. 4), the amplitude of the select pulse Si of the first one (Ri+2) of the two consecutive rows Ri has to be increased to increase the kickback effect in such a way that the voltages across the picture elements 18 decrease and the transmission of this first row (Ri+2) increases. In a situation in which the polarity of the data signals supplied to two consecutive rows Ri is negative (for example, the rows Ri+6 and Ri+7 in a positive field Fp,n), the amplitude of the select pulse of the first one (Ri+6) of the two consecutive rows Ri has to be decreased to decrease the kickback effect in such a way that the voltages across the picture elements 18 decrease and the transmission of this first row (Ri+6) increases.

The voltage across the picture elements 18 associated with a display line Ri can be modulated with the voltage modulator 40. The timing circuit 21 supplies timing information M to the voltage modulator 40 to indicate during which select periods Tr the select pulses Si need to have a higher or a lower level. For example, the voltage modulator 40 may modulate the supply voltage of the row driver circuit 20 to correct the levels of the select pulses Si. Alternatively, if the level of the select pulses Si supplied by the row driver circuit 20 is determined by a reference level, the voltage modulator may superimpose a square-wave signal on this reference level, so that the level of the select pulses Si is increased and decreased during the correct select periods Tr.

It appeared that the visibility of the residual striping artifacts is temperature-dependent. Thus, if an even better suppression of the striping artifacts is required, the correction should be temperature-dependent. If the correction is based on the kickback effect, the level of the select pulse may be temperature-dependent. This is possible by using a temperature-dependent element in the circuit which generates the modulated supply voltage, or which generates the reference level. It is also possible to measure the temperature and to correct the modulated supply voltage or the reference level accordingly.

It should be noted that the above-mentioned embodiments illustrate rather than limit the invention, and that those skilled in the art will be able to design many alternative embodiments without departing from the scope of the appended claims.

Although most embodiments are described with respect to a TFT LCD, the invention is also suitable for other matrix displays, such as, for example, passive LCDs and plasma displays. Although the embodiments describe an LCD material having a transmission which increases when the voltage across the LC material decreases, it is also possible to use LC material having a transmission which increases when the voltage across it increases. The adaptations with respect to signal levels needed to cope with this LC material can be easily implemented.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means may be embodied by one and the same item of hardware.

What is claimed is:

1. A matrix display device comprising:

a matrix display (10) with a number of display lines (R) for displaying a video signal (V) comprising, in a field (Fp), a number of video lines which is lower than the number of display lines (R), a timing circuit (21) for receiving video timing information (S) to determine consecutive and non-overlapping select periods (Tr), each select period (Tr) completely occurring within a line period (Tl) having a duration of one of the video lines, wherein at least two select periods (Tr) occur in at least one of the line periods (Tl), and a selecting circuit (20) for successively selecting the display lines (R), each display line (R) being selected during an associated one of the select periods (Tr), said timing circuit (21) being adapted to obtain select periods (Tr) all having a substantially equal duration.

2. A matrix display device as claimed in claim 1, characterized in that the timing circuit (21) is to generate:

for a certain number of consecutive video lines, one select period (Tr) during one line period (Tl) to display one video line on one corresponding display line (R), and after the certain number of consecutive video lines, two select periods (Tr) during one line period (Tl) to display a first and a second video line on two consecutive display lines (R), respectively.

3. A matrix display device as claimed in claim 2, characterized in that the matrix display device further comprises a driving circuit (3) for supplying picture signals (Ds) to picture elements (18) of the matrix display (10), the drive circuit (3) supplying picture signals (Ds) representing the same video line to said at least two consecutive display lines (R).

4. A matrix display device as claimed in claim 2, characterized in that the matrix display device further comprises a driving circuit (3) for supplying picture signals (Ds) to picture elements (18) of the matrix display (10), the drive circuit (3) supplying data signals (Ds) which are dependent on at least two consecutive video lines to said at least two consecutive display lines (R).

5. A matrix display device as claimed in claim 1, characterized in that the matrix display device further comprises a voltage modulator (40) which is coupled to the timing circuit (21) to receive timing information (M) to supply at least one modulating voltage (Vm) to the drive circuit (3) or the selecting circuit (20), the drive circuit (3) or the selecting circuit (20) being adapted to supply the data signals (Ds) or select signals (S), respectively, to the display lines (R) to obtain drive voltages across respective picture elements (18) of the first one of said at least two display lines (R) which differ with respect to the drive voltages supplied to other display lines (R) in response to the modulating voltage (Vm).

6. A matrix display device as claimed in claim 1, characterized in that the matrix display device further comprises:

switching elements (11) having switching inputs, the switching elements (11) each being arranged in series with a corresponding one of the picture elements (18) for switcheably coupling the data signals (Ds) to the picture elements (18), the picture elements (18) being connected to a common electrode (19), and a voltage modulator (40) which is coupled to the timing circuit (21) to receive timing information (M) to supply at least one modulating voltage (Vm) to the common electrode (19) to obtain drive voltages across respective picture elements (18) of the first one of said at least two display lines (R) which differ with respect to the drive voltages supplied to other display lines (R) in response to the modulating voltage (Vm).

7. A matrix display device as claimed in claim 1, characterized in that the matrix display (10) further comprises switching elements (11) having switching inputs, the switching elements (11) each being arranged in series with a corresponding one of the picture elements (18) for switcheably coupling the data signals (Ds) to the picture elements (18), and in that the selecting circuit (20) is adapted to generate a voltage waveform having a level during the first one of said at least two display lines (R) which differs from the level supplied to the other display lines (R), said voltage waveform being supplied to said switching inputs of the switching elements (11) associated with a selected one of the display lines (R).

* * * * *